United States Patent
Yano et al.

(10) Patent No.: US 8,247,577 B2
(45) Date of Patent: Aug. 21, 2012

(54) OPTICAL RECORDING MATERIAL AND CYANINE COMPOUND

(75) Inventors: Toru Yano, Tokyo (JP); Koichi Shigeno, Tokyo (JP)

(73) Assignee: Adeka Corporation, Tokyo (JP)

( * ) Notice: Subject to any disclaimer, the term of this patent is extended or adjusted under 35 U.S.C. 154(b) by 940 days.

(21) Appl. No.: 12/298,944

(22) PCT Filed: May 16, 2007

(86) PCT No.: PCT/JP2007/060059
§ 371 (c)(1),
(2), (4) Date: Oct. 29, 2008

(87) PCT Pub. No.: WO2007/135924
PCT Pub. Date: Nov. 29, 2007

(65) Prior Publication Data
US 2009/0123686 A1    May 14, 2009

(30) Foreign Application Priority Data
May 23, 2006    (JP) .................................. 2006-142458

(51) Int. Cl.
C07D 209/02    (2006.01)
G11B 7/24    (2006.01)

(52) U.S. Cl. ....... 548/455; 548/427; 548/469; 428/64.4; 428/64.8

(58) Field of Classification Search .................. 428/64.4, 428/64.8; 430/270.2, 270.21; 548/454, 455, 548/427, 469
See application file for complete search history.

(56) References Cited

U.S. PATENT DOCUMENTS 4,999,281 A * 3/1991 Inagaki et al. ........... 430/270.19
7,745,632 B2 * 6/2010 Aoyama et al. ................ 548/121

FOREIGN PATENT DOCUMENTS

| JP | 05-173282 | 7/1993 |
| JP | 11227331 A * | 8/1999 |
| JP | 2001-506933 | 5/2001 |
| JP | 2003-231359 | 8/2003 |
| JP | 2006-312710 | 11/2006 |
| WO | 2006-038464 | 4/2006 |
| WO | WO 2006109618 A1 * | 10/2006 |

OTHER PUBLICATIONS

Machine translation of JP 2003-231359 created on Sep. 30, 2011.*
Machine translation of JP 11-227331 created on Sep. 30, 2011.*
European Search Report—PCT/JP2007060059—Oct. 20, 2010.

* cited by examiner

Primary Examiner — Gerard Higgins
(74) Attorney, Agent, or Firm — Young & Thompson

(57) ABSTRACT

An optical recording material comprising at least one kind of a cyanine compound represented by the following general formula (I):

wherein ring A and ring B each independently represent a benzene ring or a naphthalene ring which may have a substituent; $R^1$ represents a group represented by the general formula (II), (II') or (II''); $R^2$, $R^3$ and $R^4$ each independently represent a hydrogen atom, an organic group having 1 to 30 carbon atoms, or a group represented by the general formula (II), (II') or (II''); $R^3$ and $R^4$ may be linked together to form a ring structure; $Y^1$ and $Y^2$ each independently represent an organic group having 1 to 30 carbon atoms or a group represented by the general formula (III); X represents a hydrogen atom, a halogen atom, an alkyl group having 1 to 4 carbon atoms, a phenyl group which may have a substituent, a benzyl group which may have a substituent, or a cyano group; $An^{m-}$ represents an m-valent anion; m is 1 or 2; and p represents a coefficient keeping the charge neutral.

2 Claims, 1 Drawing Sheet

OPTICAL RECORDING MATERIAL AND CYANINE COMPOUND

TECHNICAL FIELD

The present invention relates to an optical recording material which is mainly used for an optical recording medium, information being recorded thereon as information patterns by means of a laser and the like. Particularly, the present invention relates to an optical recording material which has absorptions in ultraviolet and visible regions and is used for an optical recording medium capable of high density optical recording and reproduction by low energy laser light and the like, and a novel cyanine compound suitable therefor.

BACKGROUND ART

The optical recording media are widely used, generally due to the superior characteristics such as large recording capacities, noncontact recording or reproduction, and the like. In the write-once optical discs such as WORM, CD-R, DVD+R, and the like, recording is carried out by focusing the laser light on a minute area of the recording layer to change properties of the optical recording layer, while reproduction is performed based on a difference in intensities of light reflected from the recorded area and non-recorded area.

In the optical recording layer of an optical recording medium represented by an optical disc, organic dyes are used because they easily form the optical recording layers. Especially, cyanine-based compounds are being examined because of having high sensitivity and corresponding to high speed recording.

Presently, in the optical discs mentioned above, the wavelength of semiconductor laser light used for recording and reproduction is between 750 and 830 nm for CD-R and between 620 and 690 nm for DVD-R. Further, a still higher density optical disc corresponding to laser light with a wavelength of 600 nm or shorter has been developed. Pentamethine cyanine compounds which correspond to these optical discs are reported, for example, in Patent Documents 1 to 11 and the like.

However, the pentamethine cyanine compounds have problems in thermal decomposition characteristics. For high speed recording, thermal interference is required to be small and, for this purpose, optical recording materials with low decomposition temperature and steep thermal decomposition characteristics are suitable. However, each of the cyanine compounds reported in the Documents did not have sufficient characteristics in this regard.

Patent Document 1: Japanese Patent Laid-Open Publication No. S59-55795
Patent Document 2: Japanese Patent Laid-Open Publication No. H05-173282
Patent Document 3: Japanese Patent Laid-Open Publication No. H11-53761
Patent Document 4: Japanese Patent Laid-Open Publication No. H11-227331
Patent Document 5: Japanese Patent Laid-Open Publication No. H11-277904
Patent Document 6: Japanese Patent Laid-Open Publication No. H11-34499
Patent Document 7: Japanese Patent Laid-Open Publication No. 2000-108510
Patent Document 8: Japanese Patent Laid-Open Publication No. 2000-289335
Patent Document 9: Japanese Patent Application Laid-Open No. 2001-506933
Patent Document 10: Japanese Patent Laid-Open Publication No. 2003-231359
Patent Document 11: Japanese Patent Laid-Open Publication No. 2006-312710

DISCLOSURE OF THE INVENTION

Problems to be Solved by the Invention

Accordingly, an object of the present invention is to provide an optical recording material containing a cyanine compound which shows a thermal decomposition behavior suitable for a high speed optical recording application and to provide a novel cyanine compound suitable for the optical recording material.

Means for Solving the Problems

In order to realize the sensitivity capable of corresponding to high speed recording, the present inventors envisaged that adjustment of thermal decomposition behavior and absorption wavelength of an optical recording material will be effective. As a result of diligent research, the inventors found that a cyanine compound having a specific molecular structure can solve the above-mentioned problems and reached the present invention.

The present invention has accomplished the above-mentioned object by providing an optical recording material comprising at least one kind of a cyanine compound represented by the following general formula (I):

[Formula 1]

wherein ring A and ring B each independently represent a benzene ring or a naphthalene ring which may have a substituent; $R^1$ represents a group represented by the following general formula (II), (II') or (II''); $R^2$, $R^3$ and $R^4$ each independently represent a hydrogen atom, an organic group having 1 to 30 carbon atoms, or a group represented by the following general formula (II), (II') or (II''); $R^3$ and $R^4$ may be linked together to form a ring structure; $Y^1$ and $Y^2$ each independently represent an organic group having 1 to 30 carbon atoms or a group represented by the following general formula (III); X represents a hydrogen atom, a halogen atom, an alkyl group having 1 to 4 carbon atoms, a phenyl group which may have a substituent, a benzyl group which may have a substituent, or a cyano group; $An^{m-}$ represents an m-valent anion; m is 1 or 2; and p represents a coefficient keeping the charge neutral:

[Formula 2]

(II)

(II')

(II")

in the general formula (II), a bond between E and G is a double bond or a triple bond; E represents a carbon atom; G represents a carbon atom, an oxygen atom, or a nitrogen atom; x, y and z each independently are 0 or 1; $R^5$ represents a hydrogen atom, a halogen atom, an alkyl group having 1 to 4 carbon atoms which may be substituted with a halogen atom, or an alkoxy group having 1 to 4 carbon atoms which may be substituted with a halogen atom; $R^6$, $R^7$ and $R^8$ each independently represent a hydrogen atom, a halogen atom, an alkyl group having 1 to 4 carbon atoms which may be substituted with a halogen atom; $R^5$ and $R^7$ may be linked together to form a naphthalene ring or an anthracene ring: in the general formula (II'), a bond between E' and G' is a double bond; E' represents a carbon atom; G' represents an oxygen atom, a sulfur atom, or a nitrogen atom; a ring containing E' and G' represents a five-membered ring which may contain a hetero atom or a six-membered ring which may contain a hetero atom; the ring containing these E' and G' may be substituted with a halogen atom, a nitro group, a cyano group, an alkyl group, or an alkoxy group: in the general formula (II"), a bond between E" and G" is a double bond; E" represents a carbon atom; G" represents a carbon atom; a ring containing E" and G" represents a five-membered ring which may contain a hetero atom or a six-membered ring which may contain a hetero atom; $R^9$ represents a halogen atom, a nitro group, a cyano group, an alkyl group having 1 to 4 carbon atoms which may be substituted with a halogen atom, or an alkoxy group having 1 to 4 carbon atoms which may be substituted with a halogen atom; and n represents an integer from 1 to 5:

[Formula 3]

(III)

wherein $R^a$ to $R^i$ each independently represent a hydrogen atom or an alkyl group having 1 to 4 carbon atoms, a methylene group of the alkyl group may be replaced by —O— or —CO—; Q represents a direct bond or an alkylene group having 1 to 8 carbon atoms, which may have a substituent, a methylene group of the alkylene group may be replaced by —O—, —S—, —CO—, —COO—, —OCO—, —SO$_2$—, —NH—, —CONH—, —NHCO—, —N=CH—, or —CH=CH—; and M represents Fe, Co, Ni, Ti, Cu, Zn, Zr, Cr, Mo, Os, Mn, Ru, Sn, Pd, Rh, Pt, or Ir.

Further, the present invention has accomplished the above-mentioned object by providing an optical recording medium having an optical recording layer formed from the optical recording material on a substrate.

Further, the present invention provides a cyanine compound represented by the general formula (IV), wherein the groups represented by $R^2$, $R^3$, $R^4$, $Y^1$ and $Y^2$ are an alkyl group having 1 to 8 carbon atoms and X is a hydrogen atom.

Further, the present invention provides a cyanine compound represented by the general formula (V), wherein the groups represented by $R^2$, $R^3$, $R^4$, $Y^1$ and $Y^2$ are an alkyl group having 1 to 8 carbon atoms, and X is a hydrogen atom. These cyanine compounds are novel compounds, which are especially suitable for optical recording materials.

BRIEF DESCRIPTION OF THE DRAWINGS

[FIG. 1]

[FIG. 2]

BEST MODE FOR CARRYING OUT THE INVENTION

Hereafter, the preferred embodiment of the present invention will be described in detail.

First, the cyanine compound represented by the general formula (I) will be described.

In the general formula (I), there is no particular restriction on the organic group having 1 to 30 carbon atoms, represented by $R^2$, $R^3$, $R^4$, $Y^1$ and $Y^2$, which includes an alkyl group such as methyl, ethyl, propyl, isopropyl, butyl, sec-butyl, tert-butyl, isobutyl, amyl, isoamyl, tert-amyl, hexyl, cyclohexyl, cyclohexylmethyl, 2-cyclohexylethyl, heptyl, isoheptyl, tert-heptyl, n-octyl, isooctyl, tert-octyl, 2-ethylhexyl, nonyl, isononyl, decyl, dodecyl, tridecyl, tetradecyl, pentadecyl, hexadecyl, heptadecyl, octadecyl, and the like; an alkenyl group such as vinyl, 1-methylethenyl, 2-methylethenyl, propenyl, butenyl, isobutenyl, pentenyl, hexenyl, heptenyl, octenyl, decenyl, pentadecenyl, 1-phenylpropen-3-yl, and the like; an alkylaryl group such as phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, cyclohexylphenyl, and the like; an arylalkyl group such as benzyl, phenethyl, 2-phenylpropan-2-yl, diphenylmethyl, triphenylmethyl, styryl, cinnamyl, and the like; groups wherein the hydrocarbon groups are interrupted by an ether bond or a thioether bond such as 2-methoxyethyl, 3-methoxypropyl, 4-methoxybutyl, 2-butoxyethyl, methoxyethoxyethyl, methoxyethoxyethoxyethyl, 3-methoxybutyl, 2-phenoxyethyl, 2-methylthioethyl, and 2-phenylthioethyl; further these groups may be substituted by an alkoxy group, an alkenyl group, a nitro group, a cyano group, a halogen atom, and the like.

A 5- or 6-membered heterocyclic ring formed by linking of $R^3$ and $R^4$, having no multiple bond, includes a pyrrolidine ring, an imidazolidine ring, a pyrazolidine ring, a thiazolidine ring, an isothiazolidine ring, an oxazolidine ring, an isoxazolidine ring, a piperidine ring, a piperazine ring, and a morpholine ring. Also, a group which links with the benzene ring to form a 5- or 6-membered ring includes a hydrocarbon group such as —CH$_2$—CH$_2$—, —CH$_2$—CH$_2$—CH$_2$—, —CH=CH—, —CH$_2$=CH$_1$—CH$_2$—, —CH$_2$—CH=CH$_2$—, and the like; a group obtained by replacing one methylene group of these hydrocarbon groups by O, S, and NH; a group obtained by replacing the methine group of these hydrocarbon groups by a nitrogen atom.

As the cyanine compounds, those which contain alkyl groups having 1 to 8 carbon atoms as $R^2$, $R^3$, $R^4$, $Y^1$ and $Y^2$ among the aforementioned examples are preferable because the production costs are low and the humidity and heat resistance is excellent.

Further, the halogen atom represented by X includes fluorine, chlorine, bromine, and iodine. An alkyl group having 1 to 4 carbon atoms represented by X, includes methyl, ethyl, propyl, isopropyl, butyl, sec-butyl, tert-butyl, isobutyl, and the like. Substituents of the phenyl and benzyl groups include a halogen atom, a hydroxyl group, an alkyl group having 1 to 8 carbon atoms, an ether group having 1 to 8 carbon atoms, an alkoxy group having 1 to 8 carbon atoms, and the like, and the number and position of the substituents are optional.

In the general formula (I), an anion represented by $An^{m-}$ includes, for example, as a monovalent anion, a halide anion such as a chloride anion, a bromide anion, an iodide anion, a fluoride anion, and the like; an inorganic anion such as a perchlorate anion, a chlorate anion, a thiocyanate anion, a hexafluorophosphate anion, a hexafluoroantimonate anion, a tetrafluoroborate anion, and the like; an organic sulfonate anion such as a benzenesulfonate anion, a toluenesulfonate anion, a trifluoromethanesulfonate anion, a diphenylamine-4-sulfonate anion, a 2-amino-4-methyl-5-chlorobenzenesulfonate anion, and a 2-amino-5-nitrobenzenesulfonate anion, and a sulfonate anion described in Japanese Patent Laid-Open Publication No. 2004-53799, and the like; an organic phosphate-related anion such as an octyl phosphate anion, a dodecyl phosphate anion, an octadecyl phosphate anion, a phenyl phosphate anion, a nonylphenyl phosphate anion, a 2,2'-methylenebis(4,6-di-tert-butylphenyl)phosphonate anion, and the like; a bistrifluoromethylsulfonylimide anion and a bisperfluorobutanesulfonylimide anion, a perfluoro-4-ethylcyclohexanesulfonate anion, a tetrakis(pentafluorophenyl)borate anion, and the like. A divalent anion includes, for example, a benzenedisulfonate anion, a naphthalenedisulfonate anion, and the like. There may also be used, according to necessity, a quencher anion which deexcites (quenches) the active molecules in the exited state, an anion of metallocene compound such as ferrocene, ruthenocene, and the like, which have anionizable groups such as carboxylic acid, phosphonic acid, sulfonic acid groups, and the like on the cyclopentadienyl group, and others.

The quencher anion includes, for example, those represented by the following general formulae (A) and (B), or the formula (C), or anions described in Japanese Patent Laid-Open Publication No. S60-234892, Japanese Patent Laid-Open Publication No. H05-43814, Japanese Patent Laid-Open Publication No. H05-305770, Japanese Patent Laid-Open Publication No. H06-239028, Japanese Patent Laid-Open Publication No. H09-309886, Japanese Patent Laid-Open Publication No. H9-323478, Japanese Patent Laid-Open Publication No. H10-45767, Japanese Patent Laid-Open Publication No. H11-208118, Japanese Patent Laid-Open Publication No. 2000-168237, Japanese Patent Laid-Open Publication No. 2002-201373, Japanese Patent Laid-Open Publication No. 2002-206061, and Japanese Patent Laid-Open Publication No. 2005-297407; Japanese Patent Application Publication No. H07-96334; International Publication WO 1998/29257, and the like.

[Formula 4]

wherein M is the same as in the general formula (III); $R^{10}$ and $R^{11}$ represent a halogen atom, an alkyl group having 1 to 8 carbon atoms, an aryl group having 6 to 30 carbon atoms, or a —SO$_2$-J group, J representing an alkyl group, an aryl group that may be substituted with an alkyl group or a halogen atom, a dialkylamino group, a diarylamino group, a piperidino group, or a morpholino group; a and b each independently represent an integer from 0 to 4; further, $R^{12}$, $R^{13}$, $R^{14}$ and $R^{15}$ each independently represent an alkyl group, an alkylphenyl group, an alkoxyphenyl group, or a halogenated phenyl group.

[Formula 5]

(C)

An alkyl group represented by $R^5$ to $R^8$ in the general formula (II), which has 1 to 4 carbon atoms and may be substituted with a halogen atom, and an alkyl group represented by $R^a$ to $R^i$ in the general formula (III), which has 1 to 4 carbon atoms, include those exemplified above by X in the general formula (I). A group resulting from replacement of a methylene group of the alkyl group by —O— includes methoxy, ethoxy, propyloxy, isopropyloxy, methoxymethyl, ethoxymethyl, 2-methoxyethyl, and the like; a group resulting from replacement of a methylene group of the alkyl group by —CO— includes acetyl, 1-carbonylethyl, acetylmethyl, 1-carbonylpropyl, 2-oxobutyl, 2-acetylethyl, 1-carbonylisopropyl, and the like.

In the general formula (II), a halogen atom represented by $R^5$ to $R^8$ includes those exemplified above by X in the general formula (I). An alkoxy group having 1 to 4 carbon atoms represented by $R^5$, which may be substituted with a halogen atom, includes methoxy, ethoxy, propoxy, 2-propoxy, butoxy, 2-butoxy, tert-butoxy, sec-butoxy, chloromethoxy, dichloromethoxy, and trichloromethoxy.

A ring structure formed by linking of $R^6$ and $R^8$ includes a cyclopropane ring, a cyclobutane ring, a cyclopentane ring, a cyclohexane ring, a tetrahydropyran ring, a piperidine ring, a piperazine ring, a pyrrolidine ring, a morpholine ring, a thiomorpholine ring, a pyridine ring, a pyrazine ring, a pyrimidine ring, a pyridazine ring, a triazine ring, a quinoline ring, an isoquinoline ring, an imidazole ring, an oxazole ring, an imidazolidine ring, a pyrazolidine ring, an isoxazolidine ring, an isothiazolidine ring, and the like. These rings may be condensed or may be substituted with other rings.

In the general formulae (II') and (II"), a 5-membered ring which may contain a heteroatom includes a cyclopentene ring, a cyclopentadiene ring, an imidazole ring, a thiazole ring, a pyrrazole ring, an oxazole ring, an isoxazole ring, a thiophene ring, a furan ring, a pyrrole ring, and the like; a 6-membered ring which may contain a heteroatom includes a benzene ring, a pyridine ring, a piperazine ring, a piperidine ring, a morpholine ring, a pyrazine ring, a pyrone ring, a pyrrolidine ring, and the like.

In the general formula (II"), the halogen atom represented by $R^9$ includes fluorine, chlorine, bromine, and iodine; an alkyl group having 1 to 4 carbon atoms, which may be substituted with a halogen atom, includes methyl, ethyl, propyl, isopropyl, butyl, sec-butyl, tert-butyl, isobutyl, chloromethyl, dichloromethyl, trichloromethyl, 2-chloromethyl, 3-chloromethyl, bromomethyl, trifluoromethyl, and the like; an alkoxy group having 1 to 4 carbon atoms which may be substituted with a halogen atom includes methoxy, ethoxy, propoxy, 2-propoxy, butoxy, 2-butoxy, tert-butoxy, sec-butoxy, chloromethoxy, dichloromethoxy, and trichlorometoxy.

In the general formula (III), an alkylene group having 1 to 8 carbon atoms and represented by Q, which may be substituted, includes methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, ethane-1,1-diyl, propane-2,2-diyl, and the like; a group resulting from replacement of a methylene group of the alkylene group by —O—, —S—, —CO—, —COO—, —OCO—, —SO$_2$—, —NH—, —CONH—, —NHCO—, —N=CH—, or CH=CH— includes methyleneoxy, ethyleneoxy, oxymethylene, thiomethylene, carbonylmethylene, carbonyloxymethylene, methylenecarbonyloxy, sulfonylmethylene, aminomethylene, acetylamino, ethylene carboxamide, ethane imide-yl, ethenylene, propenylene, and the like.

The substituent of a benzene ring and a naphthalene ring represented by ring A and ring B in the general formula (I), of a phenyl ring and a benzyl group represented by X in the general formula (I), and of an alkylene group having 1 to 8 carbon atoms represented by Q in the general formula (III) includes an alkyl group such as methyl, ethyl, propyl, isopropyl, cyclopropyl, butyl, sec-butyl, tert-butyl, isobutyl, amyl, isoamyl, tert-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl, decyl, and the like; an alkoxy group such as methyloxy, ethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy, decyloxy, and the like; an alkylthio group such as methylthio, ethylthio, propylthio, isopropylthio, butylthio, sec-butylthio, tert-butylthio, isobutylthio, amylthio, isoamylthio, tert-amylthio, hexylthio, cyclohexylthio, heptylthio, isoheptylthio, tert-heptylthio, n-octylthio, isooctylthio, tert-octylthio, 2-ethylhexylthio, and the like; an alkenyl group such as vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, eicocenyl, tricocenyl, and the like; an arylalkyl group such as benzyl, phenethyl, diphenylmethyl, triphenylmethyl, styryl, cinnamyl, and the like; an aryl group such as phenyl, naphthyl, and the like; an aryloxy group such as phenoxy, naphthyloxy, and the like; an arylthio group such as phenylthio, naphthylthio, and the like; a heterocyclic group such as pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinone-1-yl, 2-piperidone-1-yl, 2,4-dioxyimidazolidine-3-yl, 2,4-dioxyoxazolidine-3-yl, and the like; a halogen atom such as fluorine, chlorine, bromine, iodine, and the like; an acyl group such as acetyl, 2-chloroacetyl, propionyl, octanoyl, acryloyl, methacryloyl, phenylcarbonyl (benzoyl), phthaloyl, 4-trifluoromethylbenzoyl, pivaloyl, salicyloyl, oxaloyl, stearoyl, methoxycarbonyl, ethoxycarbonyl, tert-butoxycarbonyl, n-octadecyloxycarbonyl, carbamoyl, and the like; an acyloxy group such as acetyloxy, benzoyloxy, and the like; a substituted amino group such as amino, ethylamino, dimethylamino, diethylamino, butylamino, cyclopentylamino, 2-ethylhexylamino, dodecylamino, anilino, chlorophenylamino, toluidino, anicidino, N-methylanilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, tert-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino, phenylsulfonylamino, and the like; a sulfonamide group; a sulfonyl group; a carboxyl group; a cyano group; a sulfo group; a hydroxy group; a nitro group; a mercapto group; a trialkylsilyl group; an imide group; a carbamoyl group; a sulfonamide group; and others. These groups may be further substituted. In addition, a carboxyl group and a sulfo group may form a salt, a coordination compound, or a complex with an inorganic base or an organic base.

As a cyanine compound used for the optical recording material of the present invention, a compound represented by the following general formula (IV) or (V) is preferable because the production cost is low, the molar absorption coefficient is large, and the marked effects of the present invention is exhibited.

[Formula 6]

(IV)

wherein ring A, ring B, $R^2$, $R^3$, $R^4$, $Y^1$, $Y^2$, X, $An^{m-}$ and p are the same as in the general formula (I); $R^{9'}$ represents an alkyl group having 1 to 4 carbon atoms; and n is an integer from 1 to 5.

[Formula 7]

(V)

wherein ring A, ring B, $R^2$, $R^3$, $R^4$, $Y^1$, $Y^2$, $An^{m-}$ and p are the same as in the general formula (I).

A cyanine compound represented by the general formula (IV) wherein the groups represented by $R^2$, $R^3$, $R^4$, $Y^1$ and $Y^2$ are alkyl groups having 1 to 8 carbon atoms and X is a hydrogen atom, and a cyanine compound represented by the general formula (V) wherein the groups represented by $R^2$, $R^3$, $R^4$, $Y^1$ and $Y^2$ are alkyl groups having 1 to 8 carbon atoms, and X is a hydrogen atom are especially preferable as optical recording materials.

The preferable specific examples of the cyanine compound represented by the general formula (I) include the following compound Nos. 1 to 45. It is noted that the following exemplification shows cyanine cations, omitting the anions. Also, in the cyanine compound of the present invention, the polymethine chain may have a resonance structure:

[Formula 8]

Compound No.1

Compound No.2

Compound No.3

Compound No.4

Compound No.5

Compound No.9

Compound No.6

Compound No.10

Compound No.7

Compound No.11

Compound No.8

Compound No.12

[Formula 9]

Compound No.13

Compound No.14

Compound No.15

Compound No.16

Compound No.17

Compound No.18

Compound No.19

Compound No.20

Compound No.21

Compound No.22

[Formula 10]

Compound No.23

Compound No.24

Compound No.25

Compound No.26

Compound No.27

Compound No.28

Compound No.29

Compound No.30

[Formula 11]

Compound No.31

Compound No.32

Compound No.33

Compound No.34

Compound No.35

Compound No.36

Compound No.37

Compound No.38

Compound No.39

Compound No.43

Compound No.44

Compound No.40

Compound No.45

Compound No.41

Compound No.46

[Formula 12]

Compound No.42

Compound No.47

-continued

Compound No.48

Compound No.49

Compound No.50

Compound No.51

Compound No.52

-continued

Compound No.53

The cyanine compound of the present invention represented by the general formula (I) is not limited by the production method. For example, the cyanine compound is obtained by a reaction of 2 moles of an intermediate, quaternary salt derivative of 2-methylindole and a bridging agent such as N,N'-diphenylamidine and the like. Further, the group $R^1$ is introduced during the process of obtaining the intermediate, quaternary salt derivative of 2-methylindole. $R^1$ may also be introduced during the process of forming an indole ring from a starting material, arylhydrazine derivative, and a ketone derivative, or it may be introduced by a reaction of an indole ring and a halogenated methylbenzene derivative. $Y^1$ and $Y^2$ may be introduced by $Y^1$-D (D is a halogen group such as chlorine, bromine, iodine and the like; a sulfonyloxy group such as phenylsulfonyloxy, 4-methylphenylsulfonyloxy, 4-chlorophenylsulfonyloxy, and the like) which reacts with NH of an arylamine derivative or an indole ring. A specific method of obtaining the cyanine compound of the present invention includes the route shown by the following formula:

[Formula 13]

wherein ring A, ring B, $R^2$ to $R^4$, X, $Y^1$, $Y^2$, $An^{m-}$, m, and p are the same as in the general formula (I); Hal represents chlorine, bromine, or iodine.

The optical recording material of the present invention contains at least one kind of the cyanine compounds. Further, the optical recording medium of the present invention is obtained by forming on a substrate an optical recording layer composed of the optical recording material.

There is no particular restriction on the preparation of an optical recording material of the present invention, and on the method for producing an optical recording medium having an optical recording layer that is formed from the optical recording material, on a substrate of the present invention. Generally, the cyanine compound of the present invention and, if necessary, various compounds described later are dissolved in an organic solvent to obtain the optical recording material with solution state, the organic solvent including lower alcohols such as methanol, ethanol, and the like; ether alcohols such as methyl cellosolve, ethyl cellosolve, butyl cellosolve, butyl diglycol, and the like; ketones such as acetone, methyl ethyl ketone, methyl isobutyl ketone, cyclohexanone, diacetone alcohol, and the like; esters such as ethyl acetate, butyl acetate, methoxyethyl acetate, and the like; acrylic acid esters such as ethyl acrylate, butyl acrylate, and the like; fluorinated alcohols such as 2,2,3,3-tetrafluoropropanol and the like; hydrocarbons such as benzene, toluene, xylene, and the like; chlorinated hydrocarbons such as methylene dichloride, dichloroethane, chloroform, and the like. The obtained optical recording material is coated on a substrate by a wet coating method including spin coating, spraying, dipping, and the like. Methods such as vapor deposition, sputtering, and the like may also be used. When using the organic solvent, the amount used is preferably such that the content of the cyanine compound becomes 0.1 to 10% by mass of the optical recording material of the present invention.

The optical recording layer is formed as a thin film. The suitable thickness is usually 0.001 to 10 μm, preferably 0.01 to 5 μm.

Further, in the optical recording material of the present invention, the content of the cyanine compound of the present invention is preferably 10 to 100% by mass of the solid content contained in the optical recording material of the present invention. The optical recording layer is preferably formed in a manner such that the optical recording layer contains the cyanine compound of the present invention in an amount of 50 to 100% by mass. To form the optical recording layer with such a content of the cyanine compound, the optical recording material of the present invention more preferably contains the cyanine compound in an amount of 50 to 100% by mass based on the solid content contained in the optical recording material of the present invention.

The solid content of the optical recording material of the present invention refers to the components left after removing components such as solvent and the like other than the solid content from the optical recording material. The solid content of the optical recording material is preferably 0.01 to 100% by mass, more preferably 0.1 to 10% by mass.

In addition to the cyanine compound of the present invention, the optical recording material of the present invention may contain, according to necessity, compounds usually used for an optical recording layer such as azo compounds, phthalocyanines, oxonols, squarylium compounds, indoles, styryl compounds, porphyns, azlenium compounds, chroconicmethines, pyrylium compounds, thiopyrylium compounds, triarylmethanes, diphenylmethanes, tetrahydrocholines, indophenols, anthraquinones, naphthoquinones, xanthene compounds, thiazines, acridines, oxazines, spiropyrans, fluorenes, rhodamines, and the like; resins such as polyethylene, polyester, polystyrene, polycarbonate, and the like; a surfactant; an antistatic agent; a lubricating agent; a fire retardant; a radical trapping agent such as hindered amine and the like; a pit formation accelerator such as a ferrocene derivative and the like; a dispersant; an antioxidant; a crosslinking agent; a weatherability-providing agent; and the like. Further, the optical recording material of the present invention may contain, as a quencher of singlet oxygen and the like, an aromatic nitroso compound, an aminium compound, an iminium compound, a bisiminium compound, a transition metal chelate compound, and the like. In the optical recording material of the present invention, these various compounds are used in an amount of 0 to 50% by mass based on the solid content contained in the optical recording material of the present invention.

In the optical recording material of the present invention, there may be included a diimmonium compound. The residual rate with time of absorbance of the optical recording medium of the present invention is more efficiently prevented from lowering by containing the diiummonium compound. Further, when the diimmonium compound is contained, the content of the solid content of the optical recording material is preferably in a range of 0 to 99% by mass, more preferably 50 to 95% by mass.

There is no particular restriction on the material of the substrate on which such an optical recording layer is formed, as long as the material is essentially transparent to the writing (recording) light and reading (reproducing) light. The material includes, for example, such a resin as polymethyl methacrylate, polyethylene terephthalate, polycarbonate, and the like; glass and others. Further, its shape is optionally selected according to the application, from a tape, drum, belt, disc, and the like.

Further, a reflection film may be formed on the optical recording layer by vapor deposition or sputtering using gold, silver, aluminum, copper, and the like. A protection layer may also be formed by using an acrylic resin, ultraviolet light-curable resin, or the like.

The optical recording material of the present invention is suitable for an optical recording medium, which is recorded and reproduced with the use of a semiconductor laser, especially for publicly known single-, double-, or multi-layer discs such as CD-R, DVD±R, HD-DVD-R, BD-R, and the like, each being of a high-speed recording type.

EXAMPLES

Hereafter, the present invention will be described in more detail according to Examples, Comparative Examples, and Evaluation Examples. However, the present invention will not be limited in any way by the following Examples and the like.

The following Example 1 shows a production example of hexafluorophosphate of compound No. 1 and Example 2 shows a production example of hexafluorophosphate of compound No. 13, both being novel compounds of the present invention.

Further, the following Example 3 shows preparation of optical recording materials containing hexafluorophosphate of compound Nos. 1 and 13, obtained in Examples 1 and 2, and examples of production of optical recording media Nos. 1 and 2, using the optical recording materials.

In the following Evaluation Example 1 and Comparative Example 1, thermal decomposition behavior was evaluated by differential thermal analysis of hexafluorophosphate salts of compound Nos. 1 and 13, obtained in Examples 1 and 2, and comparative compound Nos. 1 and 2. The analysis was conducted under nitrogen at a heating rate of 10° C./min. The results are shown in Table 1.

Further, in the following Evaluation Example 2, UV spectra of the optical recording media obtained in Example 3 were measured. The results are shown in Table 2.

Example 1

10 mmol of a quaternary salt of indolenine represented by the following structure (1), 10 mmol of an intermediate represented by the following structure (2), 14 mmol of acetic anhydride, and 100 mmol of pyridine were charged, and the mixture was stirred at 50° C. for 4 hours. After 25 mL of chloroform and 25 mL of water were added and the oil layer was separated, the solution dispersed 11 mmol of potassium hexafluorophosphate in 25 ml of water was added to exchange the anions. After washing the oil layer, the oil layer was separated and the solvent was removed by distillation. The obtained residue was crystallized from 12.2 g of methanol. The obtained crude crystals were recrystallized from a mixture solvent of isopropyl methyl ketone and methanol. By conducting filtration, washing, and drying at 120° C. under vacuum, the desired hexafluorophosphate of compound No. 1 was obtained in a 62.5% yield. The UV absorption characteristics of a $6.09 \times 10^{-6}$ M acetonitrile solution of the obtained hexafluorophosphate of compound No. 1 were λmax at 681.0 nm and ϵ of $1.95 \times 10^5$.

[Formula 14]

Example 2

10 mmol of a quaternary salt of indolenine represented by the following structure (3), 10 mmol of an intermediate represented by the following structure (4), 14 mmol of acetic anhydride, and 100 mmol of pyridine were charged, and the mixture was stirred at 50° C. for 4 hours. After 25 mL of chloroform was added and the oil layer was separated, the solution dispersed 11 mmol of potassium hexafluorophosphate in 25 mL of water was added to exchange the anions. After washing the oil layer, the oil layer was separated and the solvent was removed by distillation. The obtained residue was crystallized from 12.2 g of methanol. The obtained crude crystals were recrystallized from a mixture solvent of isopropyl methyl ketone and methanol. The obtained crystals were dried under vacuum at 140° C. to obtain the desired hexafluorophosphate of compound No. 13 in a 44.3% yield. The UV absorption characteristics of a $6.84 \times 10^{-6}$ M acetonitrile solution of hexafluorophosphate of the obtained compound No. 13 were λmax at 677.5 nm and ϵ of $2.15 \times 10^5$.

[Formula 15]

the compounds obtained in Examples 1 and 2 were identified by $^1$H-NMR spectral analyses using deuterated dimethyl sulfoxide as the solvent in Example 1 and deuterated chloroform as the solvent in Example 2. The results of measurements are shown in the following. In addition, the charts are shown in [FIG. 1] and [FIG. 2].

Figure 1:
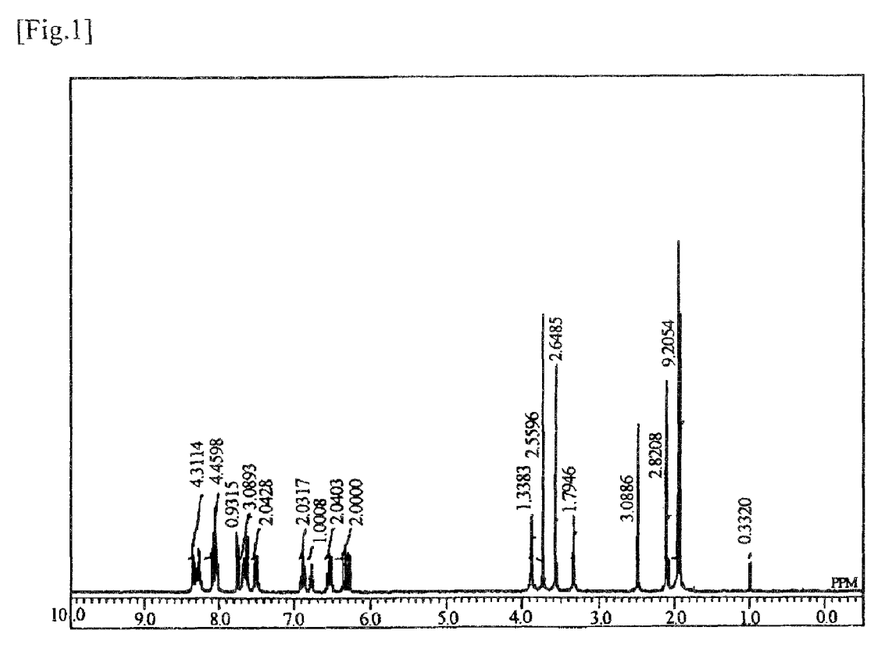
FIG. 1 shows a $^1$H-NMR spectrum of a cyanine compound (hexafluorophosphate of compound No. 1) of the present invention obtained in Example 1.

(The Results of Hexafluorophosphate of Compound No. 1)
8.36-8.24 (m, 4H), 8.10-8.02 (m, 4H), 7.75 (d, 1H), 7.70-7.61 (m, 3H), 7.53-7.47 (m, 2H), 6.92-6.86 (m, 2H), 6.78 (t, 1H), 6.37-6.27 (m, 2H), 3.89 (s, 1H), 3.74 (s, 3H), 3.57 (s, 3H), 3.34 (s, 1H), 2.11 (s, 3H), 1.96-1.93 (m, 9H)

Figure 2:
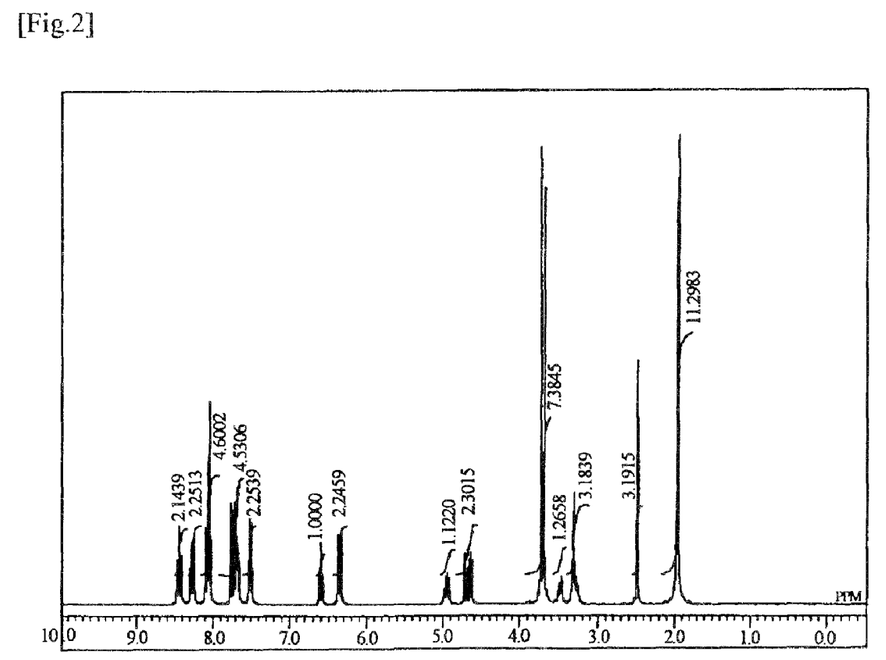
FIG. 2 shows a $^1$H-NMR spectrum of a cyanine compound (hexafluorophosphate of compound No. 13) of the present invention obtained in Example 2.

(The Results of Hexafluorophosphate of Compound No. 13)
8.21-8.15 (m, 4H), 7.93 (d, 4H), 7.61 (t, 2H), 7.46 (t, 2H), 7.39-7.30 (m, 2H), 6.61 (t, 1H), 6.17 (d, 2H), 4.99-4.88 (m, 1H), 4.75 (d, 1H), 4.64 (d, 1H), 3.72 (d, 6H), 3.53-3.48 (m, 1H), 3.19-3.14 (m, 1H), 2.03-2.00 (m, 9H)

Example 3

The hexafluorophosphate salts of compounds No. 1 and No. 13 were each dissolved in 2,2,3,3-tetrafluoropropanol so that each concentration may be 1.0% by mass to obtain the optical recording materials as 2,2,3,3-tetrafluoropropanol solutions. The optical recording materials were spin coated on the polycarbonate disc substrates with 12 cm diameter that was provided with a foundation layers (0.01 µm thick) by coating a titanium chelate compound (T-50: manufactured by Nippon Soda Co., Ltd.) and conducting hydrolysis, to form 100 nm-thick optical recording layers, and the optical recording media No. 1 and No. 2 were obtained, respectively.

Evaluation Example 1 and Comparative Evaluation Example 1

Thermal decomposition behavior of haxafluorophosphate salts of compound Nos. 1 and 13, and comparative compound Nos. 1 and 2 were evaluated. Evaluation was conducted by differential thermal analysis (DTA) at a heating rate of 10° C./min under nitrogen flow or in air. The decomposition temperature was evaluated from the exothermic DTA peak top temperature. Further, steepness of thermal decomposition was evaluated from the temperature width between the starting temperature observing thermal decomposition by DTA and exothermic peak top temperature (peak top temperature—starting temperature of thermal decomposition). The results are shown in Table 1.

TABLE 1

[Formula 16]

PF6−
Comparative compound No. 1

PF6−
Comparative compound No. 2

| No. | Cyanine compound | Thermal decomposition temperature (° C.) | Steepness of thermal decompositon (° C.) |
| --- | --- | --- | --- |
| Evaluation Example 1-1 | Hexafluorophosphate of compound No. 1 | 193.1 | 9.0 |
| Evaluation Example 1-2 | Hexafluorophosphate of compound No. 13 | 190.8 | 12.3 |
| Comparative Evaluation Example 1-1 | Comparative compound No. 1 | 279.8 | 13.6 |
| Comparative Evaluation Example 1-2 | Comparative compound No. 2 | 197.4 | 20.5 |

From the results, it was confirmed that the hexafluorophosphate salts of compound Nos. 1 and 13 that are the cyanine compounds of the present invention, show lower thermal decomposition temperatures and better steepness of thermal decomposition than those of comparative compound Nos. 1 and 13 having a similar structure. This reveals that the thermal interference is small when the hexafluorophosphate salts of compound Nos. 1 and 13 are used as optical recording materials and it is considered that these salts are suitable for high-speed recording.

Evaluation Example 2

UV absorption spectra of the optical recording media No. 1 and No. 2 were measured. When the absorption intensity of each recording medium at λmax is regarded as 1, and if the relative intensity of the absorption at the wavelength of a laser light is smaller than 0.15, the recording and reading characteristics become worse, and if the relative intensity is larger than 0.50, the light stability of the optical recording layer becomes worse and so does the storage stability of recorded information. Thus, the evaluation was conducted on the basis that the wavelength where the relative intensity is in a suitable range of 0.15 to 0.50 is the adequate wavelength for the recording light. The results are shown in Table 2.

TABLE 2

| Optical recording medium | λmax (nm) | Adequate wavelength for recording light (relative intensity) |
| --- | --- | --- |
| Evaluation Example 1-1 | Optical recording medium No. 1 | 723 | 635 nm (0.461), 760 nm (0.383), 770 nm (0.270), 780 nm (0.186) |
| Evaluation Example 1-2 | Optical recording medium No. 2 | 724 | 635 nm (0.447), 650 nm (0.494), 760 nm (0.385), 770 nm (0.263), 780 nm (0.176) |

As is clear from Table 2, it was confirmed that an optical recording medium having an optical recording layer formed from the optical recording material of the present invention has adequate wavelengths for the recording light, enabling recording and reproduction.

Industrial Applicability

The present invention provides an optical recording material suitable for formation of an optical recording layer of an optical recording medium. The specific cyanine compound of the present invention shows low decomposition temperature and steep thermal decomposition, resulting in low thermal storage and suppressed thermal interference. Therefore, the compound is suitable for formation of an optical recording layer of an optical recording medium.

The invention claimed is:

1. A cyanine compound represented by the following general formula (IV):

wherein ring A and ring B each independently represent a benzene ring or a naphthalene ring which may have a substituent; $R^2, R^3, R^4, Y^1$ and $Y^2$ each represent an alkyl group having 1 to 8 carbon atoms; $R^{9'}$ represents an alkyl group having 1 to 4 carbon atoms; n is an integer from 1 to 5; X is a hydrogen atom; $An^{m-}$ represents an m-valent anion; m is 1 or 2; and p represents a coefficient keeping the charge neutral.

2. A cyanine compound represented by the following general formula (V):

wherein ring A and ring B each independently represent a benzene ring or a naphthalene ring which may have a substituent; $R^2, R^3, R^4, Y^1$ and $Y^2$ each represent an alkyl group having 1 to 8 carbon atoms; X is a hydrogen atom; $An^{m-}$ represents an m-valent anion; m is 1 or 2; and p represents a coefficient keeping the charge neutral.

* * * * *